United States Patent
Peeters et al.

(10) Patent No.: US 8,284,795 B2
(45) Date of Patent: Oct. 9, 2012

(54) DIFFERENTIAL DELAY COMPENSATION AND MEASUREMENT IN BONDED SYSTEMS

(75) Inventors: Miguel Peeters, Brussels (BE); Raphael Cassiers, Waterloo (BE); Benoit M. S. Christiaens, Brussels (BE)

(73) Assignee: Broadcom Corporation, Irvine, CA (US)

( * ) Notice: Subject to any disclaimer, the term of this patent is extended or adjusted under 35 U.S.C. 154(b) by 932 days.

(21) Appl. No.: 11/148,556

(22) Filed: Jun. 9, 2005

(65) Prior Publication Data

US 2005/0286424 A1 Dec. 29, 2005

Related U.S. Application Data

(60) Provisional application No. 60/578,900, filed on Jun. 14, 2004.

(51) Int. Cl.
*H04J 3/16* (2006.01)
(52) U.S. Cl. ......................................... 370/465; 370/503
(58) Field of Classification Search .................. 370/468, 370/536, 235, 366, 542, 508, 503, 465
See application file for complete search history.

(56) References Cited

U.S. PATENT DOCUMENTS

| | | | |
|---|---|---|---|
| 5,450,394 A | 9/1995 | Gruber et al. | |
| 5,483,523 A * | 1/1996 | Nederlof | 370/394 |
| 5,539,734 A * | 7/1996 | Burwell et al. | 370/410 |
| 5,812,528 A | 9/1998 | VanDervort | |
| 6,259,694 B1 * | 7/2001 | Sato et al. | 370/389 |
| 6,430,397 B1 * | 8/2002 | Willrett | 455/67.11 |
| 6,449,316 B1 | 9/2002 | Matsumoto et al. | |
| 6,647,210 B1 * | 11/2003 | Toyoda et al. | 398/102 |
| 2002/0146010 A1 * | 10/2002 | Shenoi et al. | 370/395.1 |
| 2004/0100989 A1 * | 5/2004 | Chiu et al. | 370/463 |
| 2006/0251124 A1 * | 11/2006 | Colmant et al. | 370/503 |

FOREIGN PATENT DOCUMENTS

TW 490965 B 6/2002

OTHER PUBLICATIONS

European Search Report issued Jul. 28, 2005 for Appln. No. EP 05 00 5156, 7 pages.

(Continued)

*Primary Examiner* — Anh-Vu Ly
*Assistant Examiner* — Peter Cheng
(74) *Attorney, Agent, or Firm* — Sterne, Kessler, Goldstein & Fox P.L.L.C.

(57) ABSTRACT

A method for determining differential delay of at least two bonded links is described. The method comprises a step of providing, on the part of a transmitting entity, at least some of the data packets transmitted from the transmitting entity to a receiving entity with time stamps, the time stamps indicating a point of time when a respective data packet has been generated, and a step of deriving a propagation delay from a time stamp of a data packet and a time of arrival of the data packet at a receiving entity. The method further comprises a step of determining a differential delay of a link from the propagation delay of the link and a propagation delay of a reference link.

27 Claims, 3 Drawing Sheets

OTHER PUBLICATIONS

Roppel, C., International Federation for Information Processing (IFIP), "In-Service Monitoring Techniques for Cell Transfer Delay and Cell Delay Variation in ATM Networks," High Performance Networking 6., IFIP 6$^{th}$, International Conference on High Performance Networking, (HPN), Palma De Mallorca, Sep. 13-15, 1995, International Conference on High Performance Networking (HPN), London, Chapman Hall, GB, vol. Conf. 6, Sep. 11, 1995, pp. 131-142, XP-000624332.

Wittevrongel, S. et al., "Measurements and Simulations of Cell Delays in ATM Switches," European Transactions on Telecommunications, AEI, Milano, IT, vol. 9, No. 3, May 1998, pp. 237-244, XP-000766236.

English language abstract of cited document FP1 (Taiwanese Patent Publication No. TW 490965B, published Jun. 11, 2002, inventors Matsumoto Wataru et al., 1 page).

* cited by examiner

DIFFERENTIAL DELAY COMPENSATION AND MEASUREMENT IN BONDED SYSTEMS

CROSS-REFERENCE TO RELATED APPLICATIONS

This application claims benefit to U.S. Provisional Application No. 60/578,900 filed on Jun. 14, 2004, and entitled "Differential Delay Compensation and Measurement in Bonded System" which is incorporated herein by reference in its entirety.

FIELD OF THE INVENTION

The present invention relates to a transmitting entity adapted for transmitting data packets via at least two bonded links, and to a receiving entity adapted for receiving data packets via at least two bonded links. The invention further relates to a method for determining differential delay, and to a method for compensating differential delay of at least two bonded links.

BACKGROUND OF THE INVENTION

A physical link of a certain protocol standard is typically characterized by a certain capability of transmitting payload. For example, a physical link might be characterized by a certain bandwidth, or, in case of xDSL links, by a certain rate/reach capability. It is often desirable to increase the rate of data transmission by bonding multiple physical links. The concept of bonding allows to utilize the combined capabilities of several physical links. Therefore, the concept of bonding has been applied for a variety of different transmission protocols. For example, ATM bonding standards ITU-T SG15/Q4 and ANSI T1E1.4 are currently being developed. Bonding is also known in the field of Ethernet data transmission. For example, the standard IEEE 802.3ah relates to Ethernet bonding.

Whenever data packets are transmitted via a variety of different physical links, the data packet's sequential order will most likely get lost. Due to differential delays between the various links, a reordering of the received data packets has to be performed.

It is therefore an object of the invention to simplify the reception of data via a multitude of bonded links.

SUMMARY OF THE INVENTION

The present invention provides a method for determining differential delay of at least two bonded links, the method comprising the steps of providing, on the part of a transmitting entity, at least some of the data packets transmitted from the transmitting entity to a receiving entity with time stamps, the time stamps indicating a point of time when a respective data packet has been generated; of deriving a propagation delay from a time stamp of a data packet and a time of arrival of the data packet at a receiving entity; and of determining a differential delay of a link from the propagation delay of the link and a propagation delay of a reference link.

In one variant, the data packets comprise management packets, wherein the method comprises a step of transmitting the time stamps in a dedicated field of a management packet from the transmitting entity to the receiving entity.

In another variant, the method further comprises a step of transmitting an applied delay value in a dedicated field of a management packet from the transmitting entity to the receiving entity.

In one aspect, the method further comprises a step of determining a propagation delay as a difference between the time of arrival of a data packet and the data packet's time stamp.

In a further variant, the method further comprises a step of determining a differential delay by determining a difference between a propagation delay of a certain link and a propagation delay of a reference link.

In a further aspect, the method comprises a step of determining an average differential delay as an average of n evaluations of a differential delay, n being a natural number, with the delay request unit being adapted for transmitting the average differential delay to the transmitting entity.

The present invention provides a method for compensating differential delays of at least two bonded links, the method comprising the steps of providing, on the part of a transmitting entity, at least some of the data packets transmitted from the transmitting entity to a receiving entity with time stamps, the time stamps indicating a point of time when a respective data packet has been generated; of deriving a propagation delay from a time stamp of a data packet and a time of arrival of the data packet at a receiving entity; and of determining a differential delay of a link from the propagation delay of the link and a propagation delay of a reference link. The method further comprises the steps of transmitting delay requests for a certain link from the receiving entity to the transmitting entity; and of setting, on the part of the transmitting entity, a compensation delay for a certain link in accordance with the delay request received from the receiving entity.

In one variant, the compensation delay is adapted for reducing the differential delay between the link and the reference link.

In another variant, the data packets comprise management packets, and wherein the method comprises a step of transmitting the delay requests in a dedicated field of a management packet from the receiving entity to the transmitting entity.

In yet another variant, the method further comprises a step of determining a propagation delay as a difference between the time of arrival of a data packet and the data packet's time stamp.

In another aspect, the method further comprises a step of determining a differential delay by determining a difference between a propagation delay of a certain link and a propagation delay of a reference link.

In yet another aspect, the method comprises a step of determining an average differential delay as an average of n evaluations of a differential delay, n being a natural number, with the delay request unit being adapted for transmitting the average differential delay to the transmitting entity.

In yet a further variant, the invention provides a software program or product, preferably stored on a data carrier, for executing the method described herein when the computer program product is executed on a computer, processing unit, digital signal processor, or the like.

The present invention further provides a transmitting entity adapted for transmitting data packets via at least two bonded links, the transmitting entity comprising a time stamp generator adapted for providing at least some of the data packets with a time stamp before transmitting the data packets via one of the bonded links, the time stamp indicating a point of time when a respective data packet has been generated. The transmitting entity further comprises, for each of the links, a configurable delay unit adapted for delaying data packets before they are transmitted via a respective bonded link, and a delay adjustment unit adapted for setting delays of the configurable delay units in accordance with delay requests obtained from a remote receiving entity, with the delay requests being generated on the basis of the time stamps at the remote receiving entity.

In one variant, the data packets comprise management packets, with the time stamp generator being adapted for providing the management packets with a time stamp.

In another variant, the delay requests comprise information about differential delays of the bonded links.

In another variant, the delay request is transmitted in a dedicated field of the management packets from the remote receiving entity to the transmitting entity.

In yet another variant, the transmitting entity is further adapted for transmitting an applied delay value in a dedicated field of the management packets from the transmitting entity to the remote receiving entity.

In one aspect, the transmitting entity further comprises a bonding sequencer adapted for distributing data packets to the at least two bonded links, said bonding sequencer being adapted for assigning sequence IDs to data packets transmitted via the at least two bonded links.

In one aspect, the bonded links are ATM links, with the data packets being ATM packets, with Autonomous Status Messages being transmitted via the ATM links, and with the time stamp generator being adapted for providing the Autonomous Status Messages with a time stamp before transmitting the Autonomous Status Messages via one of the bonded links.

The invention further provides an xDSL transceiver unit comprising a transmitting entity as described above.

The present invention provides a receiving entity adapted for receiving data packets via at least two bonded links, the receiving entity comprising a delay evaluation unit adapted for deriving, from time stamps of data packets that have been transmitted via a certain link, and from the arrival time of the data packets at the receiving entity, propagation delays on a per-link basis, and for deriving, from the respective propagation delays, differential delays indicating the relative time delay of a link relative to a reference link.

In one aspect, the receiving entity further comprises a delay request unit adapted for transmitting delay requests from the receiving entity to a remote transmitting entity.

In one variant, the delay requests comprise information about the differential delays of the bonded links.

In another variant, the data packets comprise management packets, wherein the delay request unit is adapted for transmitting the delay requests in a dedicated field of the management packets from the receiving entity to the remote transmitting entity.

In another aspect, the delay evaluation unit is adapted for determining a propagation delay as a difference between the time of arrival of a data packet and the data packet's time stamp.

In yet another variant, the delay evaluation unit is adapted for determining a differential delay by determining a difference between a propagation delay of a certain link and a propagation delay of a reference link.

In one variant, the links are ATM links, with the data packets being ATM packets, with the management packets being Autonomous Status Messages, and with the delay requests being transmitted within the Autonomous Status Messages from the receiving entity to the remote transmitting entity.

The invention provides an xDSL transceiver unit comprising a receiving entity as described above.

The present invention further provides an xDSL loop comprising at least two bonded links; a transmitting entity adapted for transmitting data packets via at least two bonded links, the transmitting entity comprising a time stamp generator adapted for providing at least some of the data packets with a time stamp before transmitting the data packets via one of the bonded links, the time stamp indicating a point of time when a respective data packet has been generated. The transmitting entity further comprises, for each of the links, a configurable delay unit adapted for delaying data packets before they are transmitted via a respective bonded link, and a delay adjustment unit adapted for setting delays of the configurable delay units in accordance with delay requests obtained from a remote receiving entity, with the delay requests being determined on the basis of the time stamps at the remote receiving entity. The xDSL loop further comprises a receiving entity adapted for receiving data packets via at least two bonded links, with the receiving entity comprising a delay evaluation unit adapted for deriving, from time stamps of data packets that have been transmitted via a certain link, and from the arrival time of the data packets at the receiving entity, propagation delays on a per-link basis, and for deriving, from the respective propagation delays, differential delays indicating the relative time delay of a link relative to a reference link.

It is appreciated that these and other aspects of the invention will become apparent to those skilled in the art in the detailed description and drawings contained herein.

DETAILED DESCRIPTION

Figure 1:
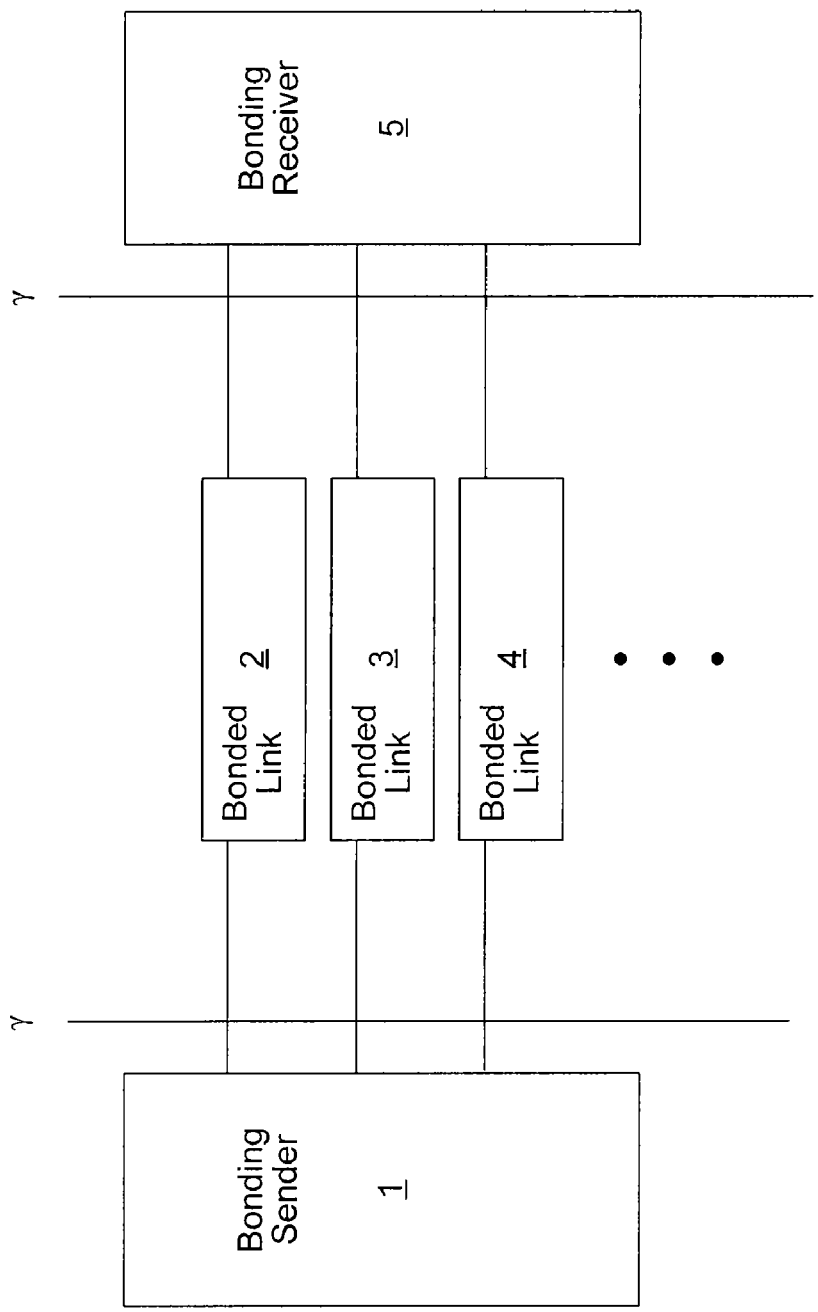
FIG. 1 shows how data traffic is transmitted from a bonding sender via a multitude of bonded links to a bonding receiver.

The present invention provides a method for determining differential delay of at least two bonded links, the method comprising the steps of providing, on the part of a transmitting entity, at least some of the data packets transmitted from the transmitting entity to a receiving entity with time stamps, the time stamps indicating a point of time when a respective data packet has been generated; of deriving a propagation delay from a time stamp of a data packet and a time of arrival of the data packet at a receiving entity; and of determining a differential delay of a link from the propagation delay of the link and a propagation delay of a reference link.

The time stamp indicates the point of time when the data packet is generated. From the time stamp and the time of arrival at the receiving entity, a propagation delay value can be derived. However, the respective clocks on the transmitting entity and on the receiving entity are not necessarily synchronized. Hence, the difference between the data packets' time of arrival and the time stamp corresponds to the actual propagation delay plus an offset. This is not a problem, though, because we are interested in differential propagation delay between a link and a reference link. When determining differential propagation delays, the respective offsets will substantially cancel. Even if the clocks on the transmitting entity and on the receiving entity are not synchronized, the obtained differential delays will turn out to be valid, provided that the offset varies slowly as a function of time. For example, if the difference between the clocks on the transmitter and on the receiver remains below 200 ppm, the offsets will vary rather slowly, and consecutive measurements made on different links may be compared.

Thus, the actual differential delays between bonded links can be determined, in order to monitor the behaviour of the various links.

According to a preferred embodiment of the invention, the data packets comprise management packets, wherein the method comprises a step of transmitting the time stamps in a dedicated field of a management packet from the transmitting entity to the receiving entity. Management cells are defined in a variety of different transmission protocols. Management cells might e.g. transmit parameters related to the status of a link, to link management, to bonding a group of links, etc. Dedicated fields of the management cells can be used for transmitting the time stamps.

Preferably, the method further comprises a step of determining a propagation delay as a difference between the time of arrival of a data packet and the data packet's time stamp.

Further preferably, the method comprises a step of transmitting an applied delay value in a dedicated field of a management packet from the transmitting entity to the receiving entity. In case a compensation delay is already applied to a certain link, the receiving entity is informed about the applied compensation delay. When determining a propagation delay without compensation, the applied compensation delay has to be taken into account.

In a preferred embodiment of the invention, the method further comprises a step of determining a differential delay by determining a difference between a propagation delay of a certain link and a propagation delay of a reference link. The required size of the reordering buffers is determined by the differential delays.

According to another preferred embodiment, the method comprises a step of determining an average differential delay as an average of n evaluations of a differential delay, n being a natural number, with the delay request unit being adapted for transmitting the average differential delay to the transmitting entity. By determining a differential delay of a certain link n times and determining an average differential delay, jitter is eliminated.

The present invention provides a method for compensating differential delays of at least two bonded links, the method comprising the steps of providing, on the part of a transmitting entity, at least some of the data packets transmitted from the transmitting entity to a receiving entity with time stamps, the time stamps indicating a point of time when a respective data packet has been generated; of deriving a propagation delay from a time stamp of a data packet and a time of arrival of the data packet at a receiving entity; and of determining a differential delay of a link from the propagation delay of the link and a propagation delay of a reference link. The method further comprises the steps of transmitting delay requests for a certain link from the receiving entity to the transmitting entity; and of setting, on the part of the transmitting entity, a compensation delay for a certain link in accordance with the delay request received from the receiving entity.

From the time stamps and the times of arrival, the receiving entity may compute differential delays of the various links with regard to a reference link. The information about the differential delays can be used for reducing or even compensating the differential delays. For this purpose, a delay request indicating differential delays, which correspond to the required compensation delays, is transmitted from the receiving entity to the transmitting entity. In the delay request, desired delays may e.g. be specified in arbitrary time units. Alternatively, desired delays may be specified in terms of a required number of bytes of a delay chain. On the part of the transmitting entity, compensation delays for the various links can be set according to the delay request.

As a consequence, the differential delays are considerably reduced, and the propagation delays of the group of bonded links is approximately the same for all the bonded links. The distortions of the sequence of transmitted data packets are minimized. The degree of reordering is significantly reduced. Therefore, the sizes of the reordering buffers can be reduced as well.

Preferably, the compensation delay is adapted for reducing the differential delay between the link and the reference link.

Further preferably, the data packets comprise management packets, wherein the method comprises a step of transmitting the delay requests in a dedicated field of a management packet from the receiving entity to the transmitting entity. In a lot of protocol implementations, management packets are defined, with the management packets being exchanged on a regular basis between the receiving entity and the transmitting entity. Dedicated fields of the management packets can be used for the transmission of the delay requests.

According to another preferred embodiment, the method further comprises a step of determining a propagation delay as a difference between the time of arrival of a data packet and the data packet's time stamp.

The invention provides a software program or product, preferably stored on a data carrier, for executing the methods described herein when the computer program product is executed on a computer, processing unit, digital signal processor, or the like.

The present invention further provides a transmitting entity adapted for transmitting data packets via at least two bonded links, the transmitting entity comprising a time stamp generator adapted for providing at least some of the data packets with a time stamp before transmitting the data packets via one of the bonded links, the time stamp indicating a point of time when a respective data packet has been generated. The transmitting entity further comprises, for each of the links, a configurable delay unit adapted for delaying data packets before they are transmitted via a respective bonded link, and a delay adjustment unit adapted for setting delays of the configurable delay units in accordance with delay requests obtained from a remote receiving entity, with the delay requests being generated on the basis of the time stamps at the remote receiving entity.

The transmitting entity comprises a dedicated configurable delay queue for each of the bonded links. The delay for a certain link is set in accordance with delay requests obtained from a remote receiving entity. As a consequence, differential delays between the bonded links can be reduced or even eliminated. As a consequence, the amount of reordering required on the part of the receiver is significantly reduced.

In a preferred embodiment, the transmitting entity further comprises a bonding sequencer adapted for distributing data packets to the at least two bonded links, said bonding sequencer being adapted for assigning sequence IDs to data packets transmitted via the at least two bonded links. On the part of the receiving unit, received data packets can be reassembled according to their sequence ID.

Preferably, the bonded links are ATM links, with the data packets being ATM packets, with Autonomous Status Messages being transmitted via the ATM links, and with the time stamp generator being adapted for providing the Autonomous Status Messages with a time stamp before transmitting the Autonomous Status Messages via one of the bonded links. In ATM bonding, Autonomous Status Messages (ASMs) are transmitted on each bonded link of a group of bonded links at a rate of approximately one ASM per second. The ASMs comprise data fields reserved for future definition. The data fields can be used for transmitting time stamps from the transmitting entity to the receiving entity. Furthermore, the data fields can be used for informing the receiving entity about an applied compensation delay. Furthermore, the data fields can be used for transmitting delay requests indicating the required compensation delay from the receiving entity to the transmitting entity.

The invention further provides an xDSL transceiver unit comprising a transmitting entity as described above. In xDSL data transmission, the rate/reach capability can be increased by means of ATM bonding. However, in particular at the central office (CO), there exist memory constraints. By compensating the differential delays, the size of the reorder buffers can be reduced.

The present invention provides a receiving entity adapted for receiving data packets via at least two bonded links, the receiving entity comprising a delay evaluation unit adapted for deriving, from time stamps of data packets that have been transmitted via a certain link, and from the arrival time of the data packets at the receiving entity, propagation delays on a per-link basis, and for deriving, from the respective propagation delays, differential delays indicating the relative time delay of a link relative to a reference link. The information about the differential delays of the various links can be used for monitoring the links' behaviour. In case a certain link's propagation delay exceeds a predefined limit, it might be necessary to remove this link from the group of bonded links.

In a preferred embodiment, the receiving entity further comprises a delay request unit adapted for transmitting delay requests from the receiving entity to a remote transmitting entity. In case of uplink transmission, the delay request can be transmitted on the corresponding downlink, and in case of downlink transmission, the delay request can be transmitted on the corresponding uplink.

The present invention further provides an xDSL loop comprising at least two bonded links; a transmitting entity adapted for transmitting data packets via at least two bonded links, the transmitting entity comprising a time stamp generator adapted for providing at least some of the data packets with a time stamp before transmitting the data packets via one of the bonded links, the time stamp indicating a point of time when a respective data packet has been generated. The transmitting entity further comprises, for each of the links, a configurable delay unit adapted for delaying data packets before they are transmitted via a respective bonded link, and a delay adjustment unit adapted for setting delays of the configurable delay units in accordance with delay requests obtained from a remote receiving entity, with the delay requests being determined on the basis of the time stamps at the remote receiving entity. The xDSL loop further comprises a receiving entity adapted for receiving data packets via at least two bonded links, with the receiving entity comprising a delay evaluation unit adapted for deriving, from time stamps of data packets that have been transmitted via a certain link, and from the arrival time of the data packets at the receiving entity, propagation delays on a per-link basis, and for deriving, from the respective propagation delays, differential delays indicating the relative time delay of a link relative to a reference link.

FIG. 1 shows a bonding sender 1 that transmits data traffic via n different bonded links 2, 3, 4, . . . to a bonding receiver 5. For transmitting a sequence of data packets, the bonding sender 1 might e.g. assign sequence IDs to the data packets and distribute the data packets to the links 2, 3, 4, . . . . Thus, the bonding sender 1 may utilize the combined bandwidth of the n bonded links. However, the propagation delays of the different links 2, 3, 4, . . . might not be equal. For example, data packets transmitted via the link 2 might be delayed by a delay x, data packets transmitted via the delay 3 might be delayed by a delay y, etc. For this reason, the order of receiving the data packets might differ from the order of sending the data packets. On the part of the bonding receiver 5, the data packets have to be reordered according to their sequence ID. For performing the task of reordering the received data packets, the bonding receiver 5 comprises one or more reordering buffers for temporarily storing the arriving packets. The size of the reordering buffers is directly related to the maximum end-to-end differential delay between the different links 2, 3, 4, . . . , whereby the term "differential delay" denotes the difference between a certain link's propagation delay and a propagation delay of a reference link.

In the field of xDSL (Digital Subscriber Line), it is well-known to bond multiple DSL loops to deliver ATM (Asynchronous Transfer Mode) payload beyond the rate/reach capability of a single DSL loop. A description of ATM-based multi-pair bonding can be found in the ATM bonding standards under development ITU-T SG15/Q4 and ANSI T1E1.4 (see attachment A).

The bonding standard allows to enforce a maximum differential delay between bonded links. However, because of the way this constraint is specified today, the only differential delay that can be guaranteed is the ADSL interleaving delay, which is based on ADSL framing parameters. This maximum delay is only related to the setting of framer parameters of the DSL link, like the delay of the ADSL interleaver. However, this delay is not equal to the end-to-end delay between the two γ interfaces shown in FIG. 1. In particular, the maximum differential delay as defined in the standard does not take into consideration the delays introduced by the implementation of the physical layers PHY, or of any other layers placed between the bonding entity and the physical layer of ADSL. For example, there is no guarantee that the bonding entity is collocated with the physical layer of ADSL, and therefore, additional buffering delays might exist.

Figure 2:
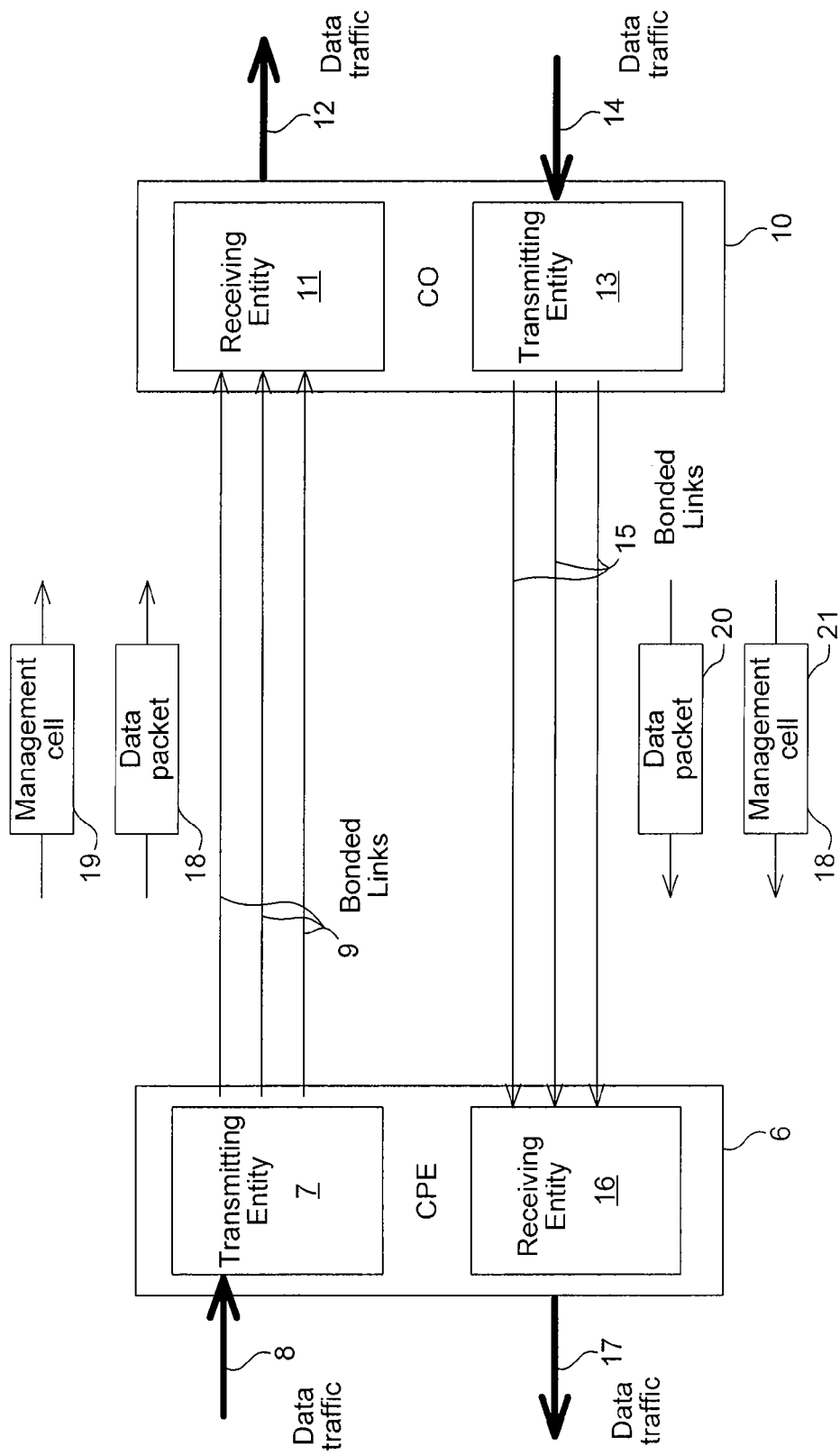
FIG. 2 shows data exchange via bonded links between a central office (CO) side and a customer premises equipment (CPE) side of an xDSL implementation.

In FIG. 2, an xDSL system comprising several bonded digital subscriber lines is shown. The CPE (Customer Premises Equipment) side 6 comprises a transmitting entity 7 adapted for transmitting data traffic 8 in the uplink direction via a multitude of bonded links 9. The CO (Central Office) side 10 comprises a receiving entity 11 adapted for receiving data packets from the various bonded links 9, for reordering the data packets, and for regenerating a data traffic 12. The CO side 10 further comprises a transmitting entity 13 adapted for transmitting data traffic 14 in the downstream direction. The transmitting entity 13 distributes data packets of the data traffic 14 to a multitude of bonded links 15. The data packets are transmitted to a receiving entity 16 on the CPE side 6. There, the data packets are reordered, and a data traffic 17 is obtained.

In the upstream direction, data packets 18 that carry payload are transmitted from the transmitting entity 7 to the receiving entity 11. Furthermore, management cells 19 comprising CPE-side status messages are transmitted from the CPE side 6 to the CO side 10. Similarly, data traffic in the downstream direction comprises data packets 20 and management cells 21.

In case of ATM links, payload is transmitted by means of ATM packets comprising 53 bytes. Additionally, Autonomous Status Messages (ASMs) are exchanged between the CPE side 6 and the CO side 10. ASMs are periodically transmitted on all bonded links of a group of bonded links. These messages are used for monitoring the status of a link and can be used by the bonding entities for dynamic link management and error control. Status messages should be transmitted no less frequently than once per second per link in the bonded group.

According to embodiments of the present invention, it is proposed to determine a respective propagation delay for each bonded link of a group of bonded links, and to derive the differential delays between the various links. This task is performed on the part of a receiving entity. In a subsequent step, the receiving entity may ask the transmitting entity to introduce a link specific compensation delay for each link in the bonded group.

For determining the propagation delay for a certain link, at least some of the packets transmitted via the link are tagged with a time stamp value when they are generated at a transmitting entity. Preferably, the management cells 19, 21 are tagged with a time stamp value. The local time at the transmitting entity may e.g. be represented by a four byte counter, with one bit corresponding to 0.1 ms. When this counter reaches its maximum value, it wraps around.

The receiving entity 11 also comprises a local clock. Whenever a management cell 19 that has been tagged with a time stamp value is received, the respective time of arrival is recorded. By subtracting the time stamp from the time of arrival, a propagation delay value is determined. Note that the local clocks on the transmitting entity 7 and on the receiving entity 11 do not need to be synchronized. As a consequence, the propagation delay value is not the actual propagation delay but rather the actual propagation+K, with K denoting an offset related to the difference between the sending clock and the receiving clock. At a certain point in time, the offset K is the same for all lines. K is changing slowly with time, but slowly enough to compare consecutive measurements made on different links even if the measurements are not made at exactly the same time. So when measuring propagation delays on two different links, the following values are obtained:

$M1$="propagation delay on link 1"+offset($t1$)

$M2$="propagation delay on link 2"+offset($t2$)

If the time difference ($t2-t1$) of the two measurements is sufficiently small, the offsets will substantially cancel, and the remaining offset (offset($t2$)−offset($t1$)) will be negligible. As a consequence, ($M2-M1$) is substantially equal to the differential propagation delay between the two links. Therefore, the local clocks on the part of the transmitting entity and on the receiving entity do not have to be synchronized. A deviation of up to 200 ppm can be tolerated.

For determining a propagation delay of a respective link, it is further necessary to know about a compensation delay that has already been applied on the part of the transmitting entity 7. Therefore, an applied compensation delay should be transmitted, together with the time stamp value, from the transmitting entity 7 to the receiving entity 11, with the applied compensation delay indicating which compensation delay is instantaneously being applied on a certain link. Preferably, the management cells 19 comprise an additional field for transmitting a 16 bit applied compensation delay.

After a management cell 19 has been received by the receiving entity 11, the time stamp value, the time of arrival and the applied compensation delay are known. From these values, the receiving entity 11 may compute the propagation delay without compensation for link I as follows:

$Pd(I,t)$=arrival($K(I,t)$)−timestamp($K(I,t)$)−appliedDelay($K(I,t)$)

In this formula, $Pd(I,t)$ denotes the propagation delay without compensation on link I at time t, with $K(I,t)$ being the index of the last management cell received on link I at time t. Furthermore, time stamp(k) denotes the time stamp placed in the management cell with index k, arrival(k) is the value of the local time when a management cell with index k has been received, and appliedDelay(k) is the value of the appliedDelay field in the management cell with index k.

For each link I, a corresponding propagation delay $Pd(I,t)$ can be determined. Once the propagation delays are known for each of the links, differential delays without compensation can be derived there from. The receiving entity 11 will choose one of the bonded links as a reference link. For example, link 0 might be chosen as the reference link. Now, the differential delays can be specified with regard to the reference link. The instant differential delay without compensation can be determined as follows:

$Idd(I,t)=Pd(I,t)-Pd(0,t)$ whereby $Idd(I,t)$ denotes the instant differential delay without compensation for link I at time t, which is computed with link 0 as reference, and whereby $Pd(I,t)$ and $Pd(0,t)$ are computed as explained above.

The differential delay without compensation $Idd(I,t)$ can be calculated each time a management cell is received by the receiving entity 11. In case of an ATM link, an autonomous status message is received about once a second, and hence, $Idd(I,t)$ can be determined about once every second. From the n most recent values of the differential delay $Idd(I,t)$, n being a natural number, an average differential delay without compensation $\overline{Idd(I,t)}$ can be derived. The purpose of averaging the differential delay values is to remove a jitter part of the delay. In order to obtain an average that is independent of any extra delay applied on the lines, the compensation is not included in $\overline{Idd(I,t)}$. However, the differential delay of line I after compensation can be expressed as:

diffdelay($I,t$)=
$\overline{Idd(I)}$+appliedDelay($I,t$)−appliedDelay($0,t$)

with $\overline{Idd(I,t)}$ denoting the average differential delay without compensation on link I, and with appliedDelay($I,t$) and appliedDelay($0,t$) denoting the applied delay at time t on link I and on link 0, respectively.

In a next step, the information about the differential delays between the different links is reported to the transmitting entity 7, and the transmitting entity 7 may introduce a link specific compensation delay for each link of the bonded group. For this purpose, the transmitting entity 7 might comprise a configurable delay unit for each one of the bonded links.

Information about the measured differential delays is transmitted within the management cells 21 from the CO side 10 to the CPE side 6. For example, the management cells 21 may comprise dedicated fields for transmitting a 16 bit requested compensation delay value indicating to the peer entity by how many time units it shall delay the traffic being sent on the particular link. In the delay request, the differential delay may be specified in terms of arbitrary time units. Alternatively, the differential delay may be specified in terms of the number of bytes used for delaying a data flow.

Management cells shall be delayed as well, whereby a respective time stamp is put in a management cell prior to delaying it. The above-described differential delay $Idd(I,t)$ or the average differential delay $\overline{Idd(I,t)}$ are e.g. well-suited for being used as a requested compensation delay value.

The transmitting entity 7 obtains the requested compensation delay values from the incoming management cells 21. In case of ATM bonding, asynchronous status messages (ASMs) are utilized for indicating the requested compensation delays.

Figure 3:
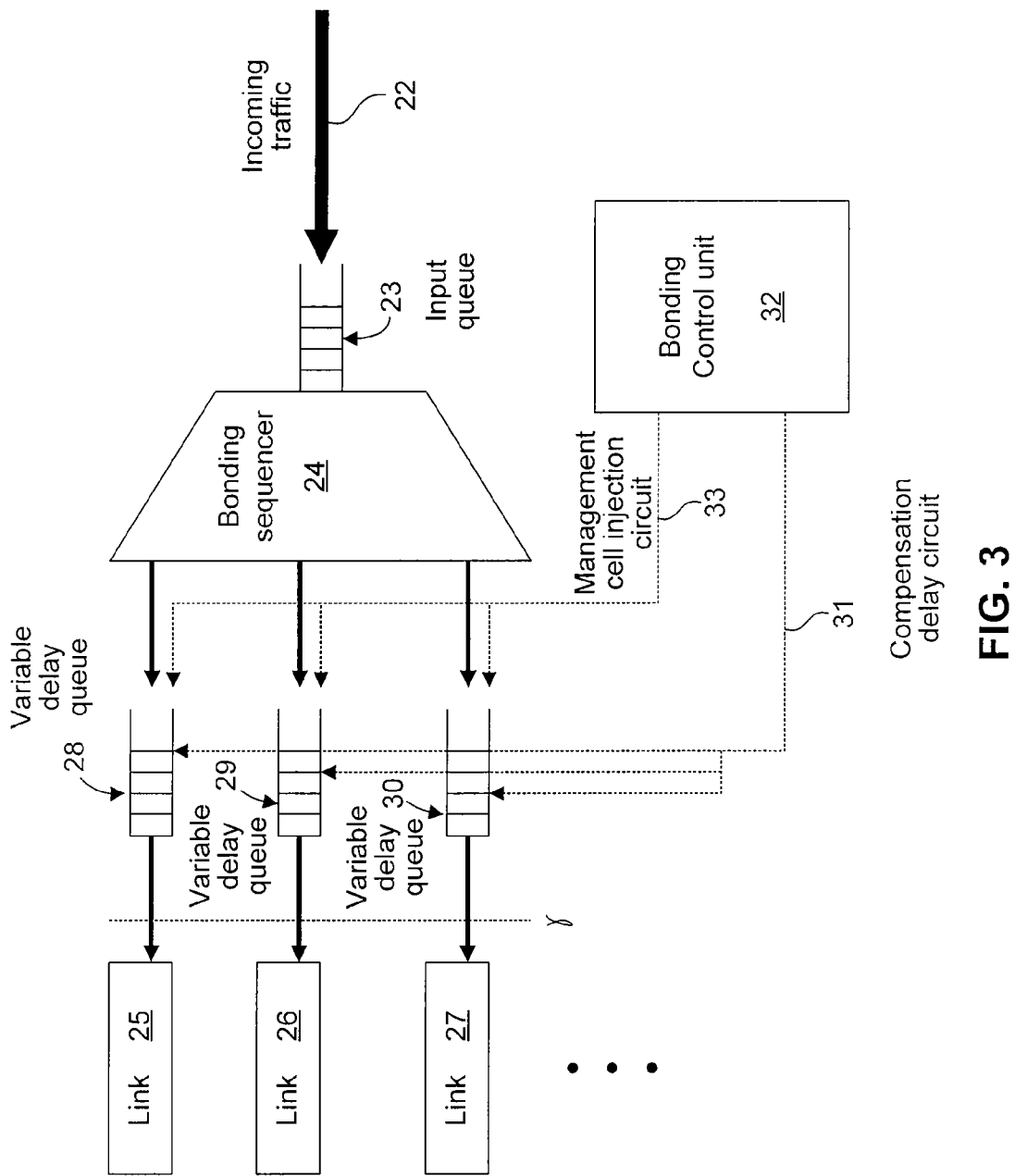
FIG. 3 shows how a sending entity can introduce a link dependent compensation delay.

In FIG. 3, it is shown how the transmitting entity 7 can introduce a link dependent compensation delay. Incoming traffic 22 is buffered in an input queue 23. A bonding sequencer 24 takes data packets from the input queue 23, tags the data packets with a sequence ID and chooses one of the links 25, 26, 27, . . . as an outgoing link. Prior to being sent, a data packet is put in a corresponding one of the variable delay queues 28, 29, 30, . he respective compensation delays of the variable delay queues are set (31) by a bonding control unit 32. Each of the data packets is delayed by a compensation delay that has been requested by the remote receiving entity. The bonding control unit 32 is further adapted for injecting (33) management cells into the variable delay queues 28, 29, 30, . . . , which means that the management cells are also subjected to the respective compensation delays. The variable delay queues 28, 29, 30, . . . are only intended to delay the data packets, they are not intended to queue incoming burst traffic. Incoming burst traffic is assumed to be queued prior to the bonding sequencer 24. In case of ATM bonding, the γ interface shown in FIG. 3 may be an utopia level 2 interface that is connected to ADSL physical layers.

In case of ATM bonding, the management cells 19, 21 shown in FIG. 2 are ASM cells. The ASM cells are sent by a bonding entity on each active link on a regular basis. The standard ANSI T1E1.4 recommends sending at least 1 ASM per link per second. In section 8.1.4 of the standard, a format of the ASMs is defined. According to a specific embodiment of the invention, the following additional information is transmitted inside each ASM cell:

1. A 32 bits time stamp value indicating when the current ASM cell is being generated. The ASM cell is assumed to be transferred through the interface γ after having applied the compensation delay that is currently installed for the link on which the ASM is being transmitted. The time stamp is an unsigned 32 bit counter, whereby one unit might e.g. correspond to 0.1 ms. When this counter reaches its maximum value, it wraps around. Octets 34 to 37 of an ASM cell, which are reserved for future definition, can be used for accommodating the time stamp value.

2. A 16 bit applied compensation delay value indicating a compensation delay currently applied by the sending entity on the link that is used for transmitting the current ASM cell. The proposal is to use octets 32 and 33 for transmitting the applied compensation delay value, with octet 32 being the most significant byte.

3. A 16 bit requested compensation delay value indicating to a peer entity by how many time units it should delay all the traffic being sent on the particular link. The requested compensation delay value is an unsigned 16 bit counter, whereby one unit might e.g. correspond to 0.1 ms. The requested compensation delay should be applied to any ATM cell just after it has been tagged with the sequence ID, and just before it passes the interface γ. In case of an ASM cell, this requested compensation delay must be applied after putting the time stamp on it and before passing the ASM cell through the γ interface. The proposal is to use octets 38 and 39 of an ASM cell for the transmission of requested compensation delay values.

By any new fields to ASM cells, or by using a different ASM message ID, the proposal of the present invention can be implemented in a way that does not cause any conflicts with implementations that do not support these mechanisms. For example, it is not mandatory for a transmitting entity to apply an additional compensation delay requested by a received ASM cell. For this reason, backward compatibility is guaranteed.

The invention is not restricted to bonding of ATM links, though. For example, the use of a management cell for the transmission of time stamps, and the transmission of a delay compensation request might also be employed in the context of any other transport protocol. For example, the invention might be applied to Ethernet bonding as referred to by the standard IEEE 802.3ah. The invention might also be used with any kind of transmission lines like e.g. twisted pair, optical fibers, etc.

What is claimed is:

1. A method for determining differential delay between at least two bonded links, comprising:
   receiving, at a receiving entity, via a first bonded link, a data packet from a transmitting entity, comprising:
      a time stamp indicating a point of time when the data packet was generated; and
      an applied delay value indicating a link transmission delay applied to the data packet before transmission, the applied delay value being contained in a field in the data packet, and wherein the applied delay value is derived, at least in part, on a delay request received by the transmitting entity from the receiving entity;
   deriving a propagation delay of the first bonded link based on the applied delay value, the time indicated by the time stamp, and a time of arrival of the data packet; and
   determining a differential delay of the first bonded link from the propagation delay of the first bonded link and a propagation delay of a second bonded link.

2. The method of claim 1, wherein the data packet comprises a management packet having a dedicated field comprising the time stamp.

3. The method of claim 1, wherein the deriving step comprises determining the propagation delay as a difference between the time of arrival of the data packet and the time indicated by the time stamp.

4. The method of claim 1, wherein the determining step comprises determining the differential delay by determining a difference between the propagation delay of the first bonded link and the propagation delay of the second bonded link.

5. The method of claim 1, further comprising a step of determining an average differential delay as an average of N evaluations of a differential delay, N being a natural number, and transmitting the average differential delay to a transmitting entity.

6. The method of claim 1, further comprising transmitting a delay request, based upon the differential delay, for the first bonded link.

7. A method for compensating a differential delay between at least two bonded links, comprising:
   transmitting, by a transmitting entity, via a bonded link to a remote receiving entity, a data packet comprising:
      a time stamp indicating when the data packet was generated; and
      an applied delay value indicating a link transmission delay applied to the data packet before transmission, wherein the applied delay value is derived, at least in part, on a delay request;
   receiving, by the transmitting entity, said delay request for the bonded link from the remote receiving entity, wherein the delay request is based on a propagation delay of at least one of the bonded links, and the propagation delay is derived from the applied delay value, the time indicated by the time stamp, and a time of arrival of the data packet; and
   setting a compensation delay for the bonded link in accordance with the delay request.

8. The method of claim 7, wherein the compensation delay reduces a differential delay between the bonded link and a second bonded link.

9. The method of claim 7, wherein the delay request is carried in a dedicated field of a management packet contained within a second data packet received from the remote receiving entity.

10. The method of claim 7, wherein the propagation delay is calculated from a difference between a time of arrival of the data packet and the time indicated by the time stamp.

11. The method of claim 7, wherein the delay request is based upon a difference between the propagation delay of the bonded link and a propagation delay of a second bonded link.

12. The method of claim 7, further comprising a step of receiving data indicating an average differential delay between the bonded link and a second bonded link.

13. A transmitting entity for transmitting data packets via at least two bonded links to a remote receiving entity, comprising:
  a time stamp generator configured to provide at least some of the data packets with a time stamp before transmitting the data packets via one of the bonded links, the time stamp indicating a time when a respective data packet has been generated;
  for each of the bonded links, a configurable delay unit configured to delay the data packets with a link transmission delay before the data packets are transmitted via a respective bonded link; and
  a delay adjustment unit configured to set applied delays of the configurable delay units in accordance with delay requests obtained from the remote receiving entity, with the delay requests being generated, at the remote receiving entity, on the basis of a propagation delay of at least one of the bonded links, and the propagation delay is derived from an applied link transmission delay value, the time indicated by the time stamp, and a time of arrival of the respective data packet,
  wherein the data packets each carry a field containing the applied link transmission delay value that was applied to the data packets prior to transmission from the transmitting entity to the remote receiving entity, and wherein the applied link transmission delay value is derived, at least in part, on one of said delay requests received by the transmitting entity from the remote receiving entity.

14. The transmitting entity of claim 13, wherein the data packets comprise management packets, with the time stamp generator being configured to provide the management packets with the time stamp.

15. The transmitting entity of claim 14, wherein the delay requests are transmitted in a dedicated field of the management packets from the remote receiving entity to the transmitting entity.

16. The transmitting entity of claim 14, wherein the transmitting entity is further configured to transmit the applied link transmission delay values in a dedicated field of the management packets from the transmitting entity to the remote receiving entity.

17. The transmitting entity of claim 13, wherein the delay requests comprise information about differential delays of the bonded links.

18. The transmitting entity of claim 13, wherein the transmitting entity further comprises a bonding sequencer configured to distribute the data packets to the at least two bonded links, the bonding sequencer being configured to assign sequence IDs to the data packets transmitted via the at least two bonded links.

19. The transmitting entity of claim 13, wherein the bonded links are asynchronous transfer mode (ATM) links, with the data packets being ATM packets, with Autonomous Status Messages being transmitted via the ATM links, and with the time stamp generator being configured to provide the Autonomous Status Messages with a respective time stamp before transmitting the Autonomous Status Messages via one of the bonded links.

20. A receiving entity for receiving data packets via at least two bonded links from a transmitting entity, the receiving entity comprising:
  a delay evaluation unit configured to derive, from a time stamp and an applied link transmission delay value carried by the data packets via a bonded link, and from an arrival time of the data packets at the receiving entity, propagation delays on a per-link basis;
  wherein the delay evaluation unit is also configured to derive, from the respective propagation delays, differential delays indicating a relative time delay of the bonded link relative to a reference link,
  wherein a data packet carries data indicating the applied link transmission delay value that was applied to the data packet prior to transmission, the applied delay value being contained in a field in the data packet, and wherein the applied delay value is derived, at least in part, on a delay request sent by the receiving entity to the transmitting entity.

21. The receiving entity of claim 20, further comprising a delay request unit configured to transmit the delay request, based on the differential delays, via the bonded link.

22. The receiving entity of claim 21, wherein the delay requests comprise information about the differential delays of the bonded links.

23. The receiving entity of claim 21, wherein the data packets comprise management packets, and wherein the delay request unit is configured to transmit the delay requests in a dedicated field of the management packets.

24. The receiving entity of claim 20, wherein the delay evaluation unit is configured to determine a propagation delay as a difference between the time of arrival of a data packet and a time indicated by the data packet's time stamp.

25. The receiving entity of claim 20, wherein the delay evaluation unit is configured to determine a differential delay by determining a difference between a propagation delay of the bonded link and a propagation delay of a reference link.

26. The receiving entity of claim 20, wherein the bonded links are asynchronous transfer mode (ATM) links, with the data packets being ATM packets, with the management packets being Autonomous Status Messages, and with the delay requests being transmitted within the Autonomous Status Messages.

27. An xDSL loop comprising:
  at least two bonded links;
  a transmitting entity configured to transmit data packets via the bonded links, the transmitting entity comprising:
    a time stamp generator configured to provide at least some of the data packets with a time stamp before transmitting the data packets via one of the bonded links, the time stamp indicating a point of time when a respective data packet has been generated;
    for each of the bonded links, a configurable delay unit configured to delay the data packets with a link transmission delay before the data packets are transmitted via a respective bonded link;
    a delay adjustment unit configured to set delays of the configurable delay units in accordance with delay requests,
    wherein the data packets each include a field indicating the applied link transmission delay value that was applied to the data packets prior to transmission over the bonded links from the transmitting entity to the remote receiving entity, wherein the applied link transmission delay value is derived, at least in part, on one of said delay requests received by the transmitting entity from the remote receiving entity; and a receiving entity configured to receive data packets via the bonded links, the receiving entity comprising a delay evaluation unit configured to derive, from time stamps and an applied link transmission delay value carried by the data packets via a bonded link, and from an arrival time of the data packets at the receiving entity, propagation delays on a per-link basis, and for deriving, from the respective propagation delays, differential delays indicating a relative time delay of the bonded link relative to a reference link, wherein the delay requests at the delay adjustment unit are obtained from the receiving entity, with the delay requests being determined, at the receiving entity, on the basis of a derived propagation delay of at least one of the bonded links based on the applied link transmission delay value, the time indicated by the time stamp, and a time of arrival of the respective data packet.

* * * * *